United States Patent Office 3,681,145
Patented Aug. 1, 1972

3,681,145
FUEL CELL BATTERY FOR REACTING A REACTANT, SUCH AS HYDRAZINE ESPECIALLY, DISSOLVED IN ELECTROLYTE
Hans Kohlmuller, Erlangen, and Dieter Kuhl, Bubenreuth, Germany, assignors to Siemens Aktiengesellschaft, Berlin, Germany
Filed Sept. 9, 1970, Ser. No. 70,765
Claims priority, application Germany, Sept. 11, 1969, P 19 45 945.1
Int. Cl. H01m 27/00
U.S. Cl. 136—86 R                 6 Claims

ABSTRACT OF THE DISCLOSURE

Fuel cell battery for reacting a reactant, such as hydrazine especially, dissolved in electrolyte, the same includes a stack of superimposed components A with respective components B and C at opposite ends of the stack thereof, the stack being embedded in a casing of molding resin, the component A comprising a pair of diaphragms with a support frame, a spacer screen, a contact plate, a sealing frame and electrodes of different polarities sandwiched therebetween; the component B comprising a diaphragm and a contact plate with an electrode, a support frame and a sealing frame sandwiched therebetween, and the component C comprising a diaphragm and a contact plate with a spacer screen, a sealing frame and an electrode sandwiched therebetween, the sealing frames, the diaphragms and contact plates being provided with fins and formed with bores for supplying the reactants to and discharging the same from the battery, and the sealing frames being firmly bonded to the contact plates and diaphragms of the respective components; and method of producing the fuel cell battery.

Figure 1:
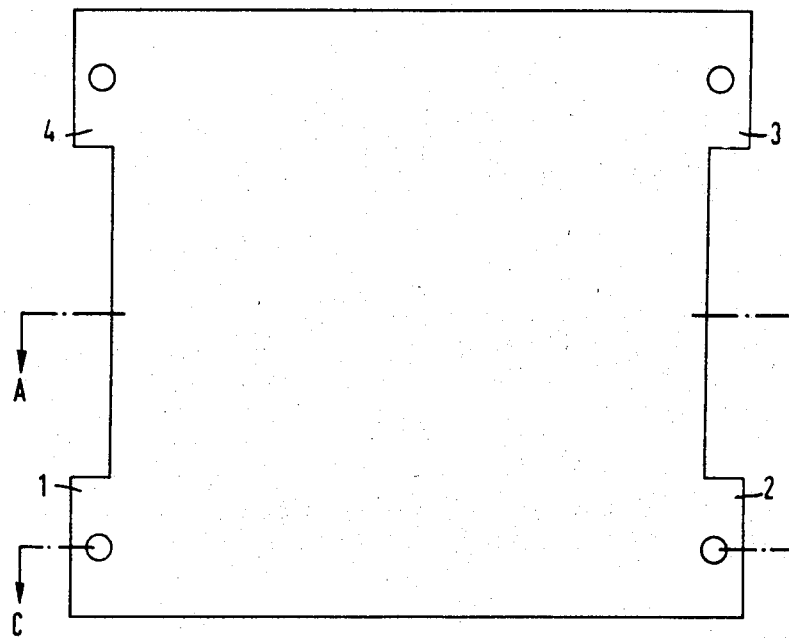

Our invention relates to fuel cell battery for reacting a reactant, such as hydrazine especially, dissolved in electrolyte and method of producing the same, wherein the battery is constructed of prefabricated components and is encased in molding resin, as well as a method of producing the fuel cell battery.

It has been known, heretofore, to combine or integrate into a battery, by means of plastic materials, bilaterally operative gas-diffusion electrodes of fuel cells. This has been effected, for example, by stacking positive and negative electrodes in alternating sequence, one upon the other, and encasing them with molding resin in a suitable mold, spacer frames, which form the space for subsequently receiving therein electrolyte and which prevents the penetration of the molding resin into the electrolyte chamber, being inserted between the electrodes and being subsequently removed therefrom after the molding resin has hardened. Supplied or connected channels provided for the electrolyte or gases have been constructed by placing formed bodies of materials, such as polyvinylalcohol, for example, which are not wetted by molding resin, on or within the stack of electrodes prior to the molding operation, and, after subsequent hardening of the molding resin are again dissolved or melted therefrom. A fuel cell battery of such construction does not, however, operate optimally with reactants that are dissolved in the electrolyte.

It is object of the present invention to provide fuel cell battery for reacting a reactant, such as hydrazine especially, dissolved in electrolyte, and method of producing the same, wherein the difficulties occurring heretofore in the formation of channels and the sealing of hollow spaces in encased or sealed batteries, are avoided.

With the foregoing and other objects in view, we provide, in accordance with our invention, fuel cell batteries for reacting a reactant such as hydrazine especially, dissolved in electrolyte comprising a stack of superimposed components A with respective components B and C at opposite ends of the stack thereof, the stack being embedded in a casing of molding resin, the component A comprising a pair of diaphragms with a support frame, a spacer screen, a contact plate, a sealing frame and electrodes of different polarities sandwiched therebetween; the component B comprising a diaphragm and a contact plate with an electrode, a support frame and a sealing frame sandwiched therebetween, and the component C comprising a diaphragm and a contact plate with a spacer screen, a sealing frame and an electrode sandwiched therebetween, the sealing frame, the diaphragms and the contact plates being provided with fins and formed with bores for supplying the reactants to and discharging the same from the battery, and the sealing frames being firmly bonded to the contact plates and diaphragms of the respective components; and method of producing the fuel cell battery.

The technical improvement in the art provided by the fuel cell battery of our invention is that two diaphragms are located between the gas chamber and the electrolyte chamber and serve to close the gas and electrolyte chambers in a relatively simple manner. The bores and channels for the supply and discharge of the reactants are formed in the individual components before the encasement of the battery, thereby considerably facilitating and improving the start-up, as well as the operational reliability of the battery. Blockage or obstruction of the lines or channels provided for transporting the reactants within the battery, as well as impairments of the catalyst, which has been frequently observed when the formed body is dissolved or melted out of the molded casing, are thereby precluded.

The features which are considered characteristic for the invention are set forth in the appended claims.

Although the invention is illustrated and described herein as embodied in fuel cell battery for reacting a reactant, such as hydrazine especially, dissolved in electrolyte and method of producing the same, it is nevertheless not intended to be limited to the details shown, since various modifications and structural changes may be made therein without departing from the spirit of the invention and within the scope and range of equivalents of the claims.

Figure 2:
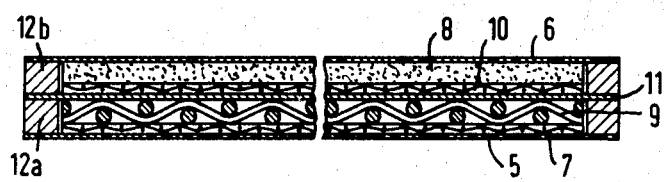
Figure 3:
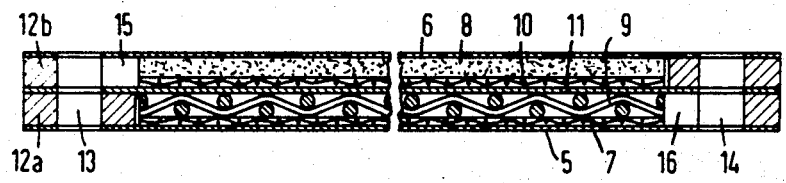
Figure 4:
Figure 5:
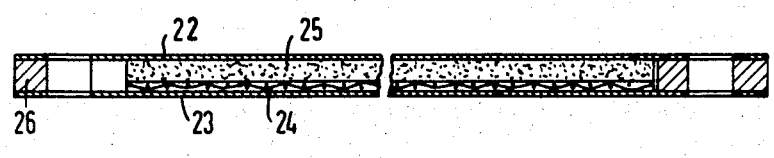

The construction and method of operation of the invention, however, together with additional objects and advantages thereof, will be best understood from the following description of specific embodiments, when read in conjunction with the accompanying drawings, in which:

FIG. 1 is a plan view of component A;
FIG. 2 is a sectional view of FIG. 1 taken along the line II—II in the direction of the arrows;
FIG. 3 is a sectional view of FIG. 1 taken along the line III—III in the direction of the arrows;
FIGS. 4 and 5 are sectional views of components B and C, respectively, of the fuel cell battery.

Referring now to the drawing and first, particularly to FIG. 1 thereof, there is shown a plan view of component A which is formed of superimposed diagrams, sealing frames, and contact plates, in sandwich-like shape, and formed with fins 1–4. The fins are provided with bores 13 and 14 for supplying and discharging the reactants of the fuel cell batteries. The reactant dissolved in the electrolyte is transported, in the illustrated component of FIG. 1, through the bores 13 and 14 formed in the fins 1 and 3, and the gaseous oxidant, such as oxygen or air, for example, is transported through the bores 13 and 14 formed in the fins 2 and 4. The sealing frames 12a, 12b (FIG. 2 for example), which are located between the contact plate 11 and the diaphragms 5 and 6, respectively, are in fact also provided with bores (FIG. 3) within the fins, branching channels 15 and 16 extending from the bores 13 and 14 into the electrolyte chamber and gas chamber, depending upon the position of the bores 13 and 14 in the component A.

FIGS. 2 and 3 represent sections of the component A shown in FIG. 1, and as shown therein, a pair of diaphragms 5 and 6 sandwich together an anode 7, a cathode 8, a support frame 9, a spacer grid or screen 10, and a contact plate 11, therebetween. As further shown in FIG. 3, the sealing frames 12a and 12b are provided with bores 13 and 14 which communicate through branching channels 15 and 16 with the gas chamber provided by the spacer grid 10 located adjacent the cathode 8 or with the electrolyte chamber provided by the support frame 9 adjacent the anode 7, formed of a screen, respectively.

The sealing frames 12a and 12b, in the fuel cell battery of the invention, are formed of an elastomer which is resistant to the reactants and the electrolyte, such as polychlorbutadiene (Neoprene) for example. The sealing frames 12a and 12b are gas and liquid-tightly connected or bonded to the diaphragms 5 and 6 which are formed advantageously of asbestos paper, and with the contact plate 11, which is formed of nickel or acid-resistant steel. The bonding of the sealing frames 12a and 12b can be effected in a conventional manner, for example, with adhesives or by vulcanization.

The production of component A can be effected, for example, by initially applying a solvent to both sides of the contact plate so as to remove grease therefrom; by sand-blasting the edge of the contact plate with aluminum oxide (Corundum); then, a vulcanizing base is immediately applied to the edge and, after drying in air, for 5 minutes at 70° C. is baked into the same. A vulcanizing solution is thereafter applied to both sides of the vulcanizing base and, after drying, the spacer screen 10 and the support 9, as well as the electrodes 7 in the form of a screen, are applied thereto by spot welding.

In an analogous manner, the Neoprene of which the sealing frames 12a and 12b are formed, is initially stripped of grease and has applied on both sides thereof a vulcanizing solution. After drying, the sealing frames 12a and 12b are stamped out of the pretreated Neoprene. The diaphragms formed of asbestos paper in this embodiment of our invention, are coated with vulcanizing solution, preferably several times, prior to the vulcanization process and, after drying, are vulcanized with the aforedescribed pretreated individual parts of the component A at 150° C. and a pressure of substantially 2 kp./cm.² for 20 minutes The component B, shown in FIG. 4, is formed solely of a diaphragm 20 and a contact plate 21, between which a support frame 17, an anode 18 and a sealing frame 19 are sandwiched so as to form a half-cell which is placed at one end of the stack of component A, in accordance with our invention.

A second half-cell (Component C) which is disposed at the other end of the stack of component A is shown in FIG. 5. The component C is formed of a diaphragm 22 and a contact plate 23 between which is a spacer screen 24, a cathode 25 and a sealing frame 26, are sandwiched.

The electrodes disposed in the fuel cell battery according to our invention are preferably formed of pulverulent catalyst material which is advantageously solidified by suitable binding means. The anodes 7 and 18 are advantageously in the form of screen electrodes constructed of noble metal or out of a carrier screen formed of steel or nickel and coated with noble metal.

We claim:

1. Fuel cell battery for reacting a reactant, such as hydrazine especially, dissolved in electrolyte, comprising a stack of superimposed components A with respective components B and C at opposite ends of the stack thereof, said stack being embedded in a casing of molding resin, said component A comprising a pair of diaphragms with a support frame, a spacer screen, a contact plate, a sealing frame and electrodes of different polarities sandwiched therebetween; said component B comprising a diaphragm and a contact plate with an electrode, a support frame and a sealing frame sandwiched therebetween, said component C comprising a diaphragm and a contact plate with a spacer screen, a sealing frame and an electrode sandwiched therebetween, said sealing frames, said diaphragms and said contact plates being provided with fins and formed with bores for supplying the reactants to and discharging the same from the battery, and said sealing frames being firmly bonded to the contact plates and the diaphragms of the respective components.

2. Fuel cell battery according to claim 1, wherein said sealing frames are formed of an elastomer.

3. Fuel cell battery according to claim 2, wherein said elastomer is polychlorbutadiene.

4. Fuel cell battery according to claim 1, wherein said sealing frames are secured by adhesive to said contact plates and said diaphragms.

5. Fuel cell battery according to claim 1, wherein said sealing frames are secured by vulcanizing means to said contact plates and said diaphragms.

6. Fuel cell battery according to claim 1, wherein said diaphragms are formed of asbestos.

References Cited

UNITED STATES PATENTS

| | | | |
|---|---|---|---|
| 690,770 | 1/1902 | Morrell | 136—87 |
| 2,928,783 | 3/1960 | Bacon | 136—86 X |
| 2,969,315 | 1/1961 | Bacon | 136—20 X |
| 3,554,812 | 1/1971 | Sturm et al. | 136—86 D |

WINSTON A. DOUGLAS, Primary Examiner

H. A. FEELEY, Assistant Examiner